(12) United States Patent
Gurunathan et al.

(10) Patent No.: US 11,861,034 B2
(45) Date of Patent: Jan. 2, 2024

(54) DEVICES, METHODS AND COMPUTER READABLE MEDIUMS FOR SECURITY AND AUTHENTICATION

(71) Applicant: Mastercard International Incorporated, Purchase, NY (US)

(72) Inventors: Arunmurthy Gurunathan, Maharashtra (IN); Ankit Kothari, Maharashtra (IN)

(73) Assignee: Mastercard International Incorporated, Purchase, NY (US)

( * ) Notice: Subject to any disclaimer, the term of this patent is extended or adjusted under 35 U.S.C. 154(b) by 592 days.

(21) Appl. No.: 15/962,368

(22) Filed: Apr. 25, 2018

(65) Prior Publication Data

US 2018/0314852 A1 Nov. 1, 2018

(51) Int. Cl.
*G06F 21/62* (2013.01)
*G06F 21/35* (2013.01)
*G06F 21/32* (2013.01)
*G06Q 20/40* (2012.01)
*G06Q 20/20* (2012.01)
*H04L 9/40* (2022.01)
*G06F 21/31* (2013.01)
*G06Q 20/32* (2012.01)
(Continued)

(52) U.S. Cl.
CPC .......... *G06F 21/6245* (2013.01); *G06F 21/31* (2013.01); *G06F 21/32* (2013.01); *G06F 21/35* (2013.01); *G06Q 20/202* (2013.01); *G06Q 20/204* (2013.01); *G06Q 20/327* (2013.01); *G06Q 20/3223* (2013.01); *G06Q 20/4012* (2013.01); *G06Q 20/4016* (2013.01); *H04L 63/0853* (2013.01); *H04W 12/06* (2013.01); *G06N 20/00* (2019.01)

(58) Field of Classification Search
CPC ...... G06F 21/6245; G06F 21/31; G06F 21/32; G06F 21/35; G06Q 20/202; G06Q 20/204; G06Q 20/3223; G06Q 20/327; G06Q 20/4012; G06Q 20/4016; H04L 63/0853; H04W 12/06; G06N 20/00
See application file for complete search history.

(56) References Cited

U.S. PATENT DOCUMENTS

| 9,104,271 | B1* | 8/2015 | Adams ................. G06F 3/0233 |
| 10,762,183 | B1* | 9/2020 | Charan ................. G06F 21/40 |
| 2007/0164878 | A1 | 7/2007 | Baier et al. |

(Continued)

OTHER PUBLICATIONS

Indian Patent Office Examination Report; IN 201814015206; dated Jun. 29, 2020.

*Primary Examiner* — Florian M Zeender
*Assistant Examiner* — Joseph M Mutschler
(74) *Attorney, Agent, or Firm* — Pramudji Law Group PLLC; Ari Pramudji

(57) ABSTRACT

Disclosed are various computer implemented devices, methods and readable mediums for security and authentication. In one aspect there is provided a wearable device for authenticating a user, including: one or more sensors for obtaining sensor data related to movement of fingers of the user wearing the wearable device to provide authentication data; and one or more processors configured to: receive the sensor data; interpret the sensor data using one or more classifiers to determine the authentication data; and use the authentication data to access a service.

19 Claims, 10 Drawing Sheets

(51) Int. Cl.
*H04W 12/06* (2021.01)
*G06N 20/00* (2019.01)

(56) References Cited

U.S. PATENT DOCUMENTS

| | | | |
|---|---|---|---|
| 2014/0125596 A1* | 5/2014 | Park | G06F 3/014 |
| | | | 345/169 |
| 2015/0054748 A1* | 2/2015 | Mason | G06F 3/017 |
| | | | 345/168 |
| 2015/0233779 A1* | 8/2015 | Chen | G01P 15/00 |
| | | | 702/139 |
| 2015/0370326 A1* | 12/2015 | Chapeskie | G06F 1/163 |
| | | | 345/156 |
| 2016/0091980 A1* | 3/2016 | Baranski | A61B 5/6824 |
| | | | 345/156 |
| 2016/0180594 A1* | 6/2016 | Todeschini | G06F 3/017 |
| | | | 345/633 |
| 2016/0267732 A1* | 9/2016 | Agrafioti | A61B 5/318 |
| 2017/0302669 A1* | 10/2017 | Chen | H04L 63/08 |
| 2018/0107278 A1* | 4/2018 | Goel | G06F 3/0426 |

\* cited by examiner

DEVICES, METHODS AND COMPUTER READABLE MEDIUMS FOR SECURITY AND AUTHENTICATION

This application is a U.S. National Stage filing under 35 U.S.C. § 119, based on and claiming benefits of and priority to Singapore Patent Application No. 10201703483P filed on Apr. 28, 2017. The entire disclosure of the above application is incorporated herein by reference.

TECHNICAL FIELD

The present invention relates to computer implemented devices, methods and readable mediums for security and authentication.

BACKGROUND

A number of techniques can be used by malicious parties to obtain private or sensitive information which is input to or displayed by a processing system.

For example, one technique includes "shoulder surfing" where a malicious party watches the user input sensitive or private information into the processing system via an input device. In some instances, a device, such as a camera, may be used to capture the data being input by the user. In some instances, a user may access sensitive information such as an email inbox including private emails and step away for a short period of time from the processing system thereby allowing a malicious party to access the sensitive information displayed by the processing system. Furthermore, devices which are used for authentication, such as POS devices and Automatic Teller Machines, can be tampered with in order to obtain critical data such as the user's PIN.

Therefore, there is a need to alleviate one or more of the above-mentioned problems.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

In one aspect there is provided a wearable device for authenticating a user, including:
one or more sensors for obtaining sensor data related to movement of fingers of the user wearing the wearable device to provide authentication data;
one or more processors configured to:
receive the sensor data;
interpret the sensor data using one or more classifiers to determine the authentication data; and
use the authentication data to access a service.

In another aspect there is provided a non-transient computer readable medium including executable instructions which, when executed by one or more processors, configure a wearable device for authenticating a user, wherein the wearable device includes
one or more sensors for obtaining sensor data related to movement of fingers of the user wearing the wearable device to provide authentication data, wherein the one or more processors are configured to:
receive the sensor data;
interpret the sensor data using one or more classifiers to determine the authentication data; and
use the authentication data to access a service.

In another aspect there is provided a point-of-sale (POS) system including:
a POS device; and
a user input device, physically separate to the POS device configured to:
receive authentication data from a user interacting with the user input device;
establish a wireless connection with the POS device; and
wirelessly transfer the authentication data to the point-of-sale device for authentication in order to process a transaction by the user.

In another aspect there is provided one or more non-transient computer readable mediums including executable instructions which, when executed by one or more processors of a user input device, physically separate to a POS device, configure the user input device to:
receive authentication data from a user interacting with the user input device;
establish a wireless connection with the POS device; and
wirelessly transfer the authentication data to the point-of-sale device for authentication in order to process a transaction by the user.

In another aspect there is provided a PIN entry device including:
a plurality of buttons, each button having an electronic display; and
one or more processors electrically coupled to the plurality of buttons, wherein the one or more processors are configured to:
determine random digit layout mapping data;
control presentation of a digit by the electronic display of each button according to the random digit layout mapping data; and
receive input data by a user selecting one or more of the buttons; and
determine, based on the input data and the random digit layout mapping data, a PIN for the user.

In another aspect there is provided a method performed by a PIN entry device, the PIN entry device including a plurality of buttons, each button having an electronic display; and one or more processors electrically coupled to the plurality of buttons, wherein the one or more processors perform steps of:
determining random digit layout mapping data;
controlling presentation of a digit by the electronic display of each button according to the random digit layout mapping data; and
receiving input data by a user selecting one or more of the buttons; and
determining, based on the input data and the random digit layout mapping data, a PIN for the user.

In another aspect there is provided a non-transient computer readable medium including executable instructions which, when executed by one or more processors associated with the PIN entry device, configure the PIN entry device to present a random digit layout, wherein the PIN entry device includes a plurality of buttons, each button having an electronic display and the one or more processors electrically coupled to the plurality of buttons, wherein the one or more processors are configured to:
determine random digit layout mapping data;

control presentation of a digit by the electronic display of each button according to the random digit layout mapping data; and receive input data by a user selecting one or more of the buttons; and determine, based on the input data and the random digit layout mapping data, a PIN for the user.

In another aspect there is provided a processing system including one or more processors coupled to one or more sensors, an output device and an input device, wherein the one or more processors are configured to:

receive sensor data;

analyse the sensor data to detect whether there is a security risk of sensitive data being vulnerable, the sensitive data being input by a user using the input device or output by the output device and being associated with an application being executed by the processing system; and disable the application in response to detecting the security risk.

In another aspect there is provided a method for detecting a security risk for a processing system, the processing system including and one or more processors coupled one or more sensors, an output device and an input device, wherein method includes, the one or more processors, performing steps of:

receiving sensor data;

analysing the sensor data to detect whether there is a security risk of sensitive data being vulnerable, the sensitive data being input by a user using the input device or output by an the output device and being associated with an application being executed by the processing system; and disabling the application in response to detecting the security risk.

In another aspect there is provided a non-transient computer readable medium including executable instructions which when executed by the processing system, configures the processing system for detecting a security risk, wherein the processing system includes or is coupled to one or more sensors, an output device, an input device, and one or more processors, wherein the one or more processors are configured to:

receive sensor data;

analyse the sensor data to detect whether there is a security risk of sensitive data being vulnerable, the sensitive data being input by a user using the input device or output by the output device and being associated with an application being executed by the processing system; and disable the application in response to detecting the security risk.

Other aspects and embodiments will be appreciated throughout the description.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION

Figure 1:
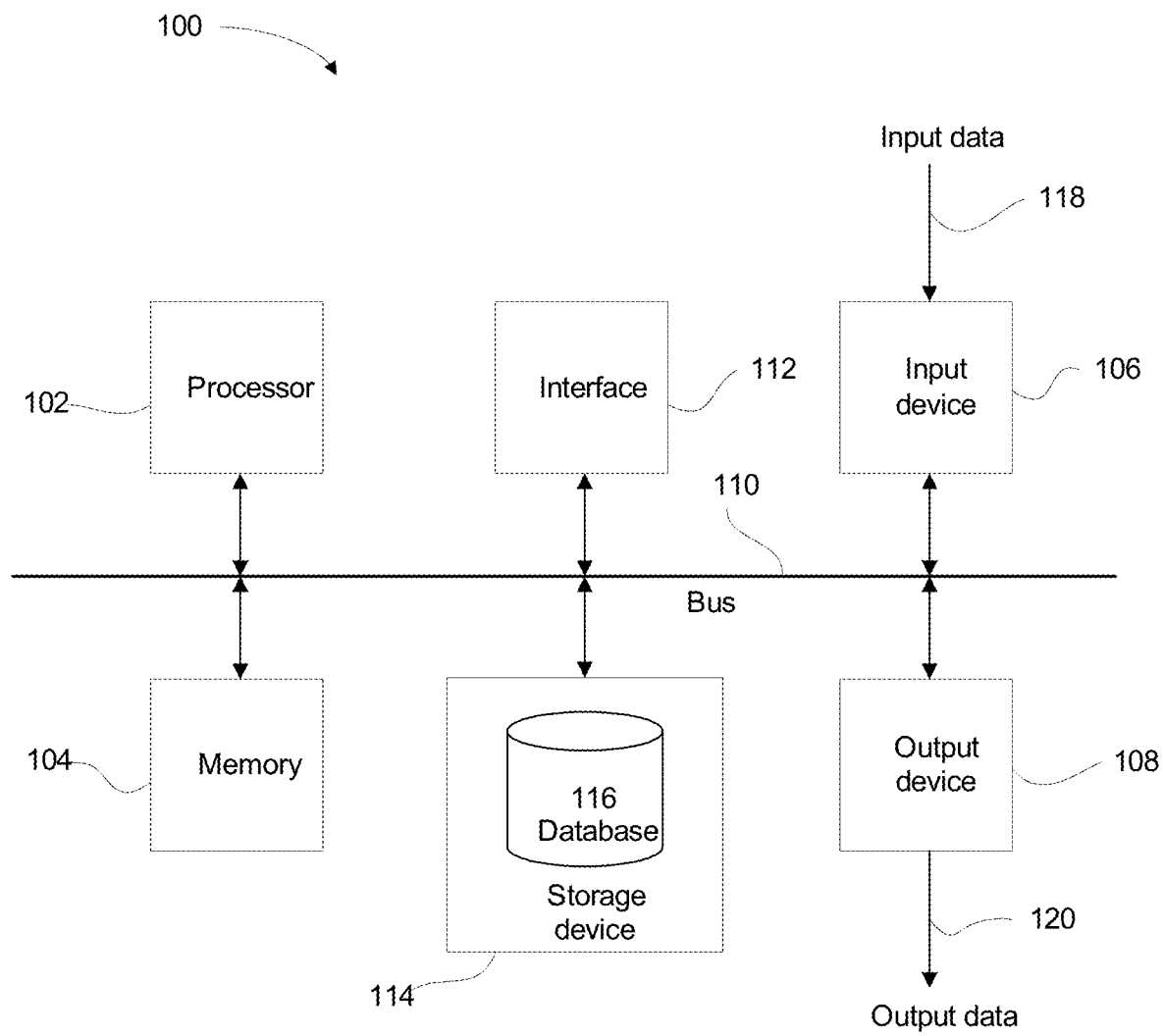
FIG. 1 illustrates a functional block diagram of an example processing system that can be utilized to embody or give effect to a particular embodiment.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Particular embodiments of the present invention relate to minimizing a risk of malicious parties being able to obtain private or sensitive information which is input to or displayed by a processing system.

In one embodiment, there is provided a wearable device for authenticating a user. The wearable device includes one or more sensors. The sensors detect movement of fingers of the user wearing the wearable device. The data corresponding to the movement of fingers is further processed using one or more classifiers to determine authentication data. In one example, the classifiers are trained in a training mode to interpret the sensor data and the trained classifiers are then used for interpreting. Examples of the classifiers include a number of finger taps represented by each finger tap segment. The authentication data is then used to access a service. For example, the authentication data can be transmitted to another entity for authentication and subsequent access to corresponding service.

In another embodiment, there is provided a point-of-sale (POS) system where a POS device; and a physically separate wearable user input device interact in a way whereby authentication data from a user interacting with the user input device is wirelessly communicated with the POS device in order to process a transaction by the user. An example of the authentication data is a PIN number input via a PIN pad interface displayed at the wearable user input device. The PIN pad interface can be enabled by installation of an "app" on the user input device.

In a further embodiment, there is a PIN entry device/interface including a plurality of buttons, each button having an electronic display for display digits. The digits in each button are presented in a random manner in accordance to an arrangement defined by a random digit layout generator, whereby input data by a user selecting one or more of the buttons is received as a PIN for the user.

Corresponding methods relating to the aforementioned devices and systems are also disclosed. Further details of the various embodiments will be described in the following paragraphs.

Particular embodiments of the present invention can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 also can be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

Figure 2:
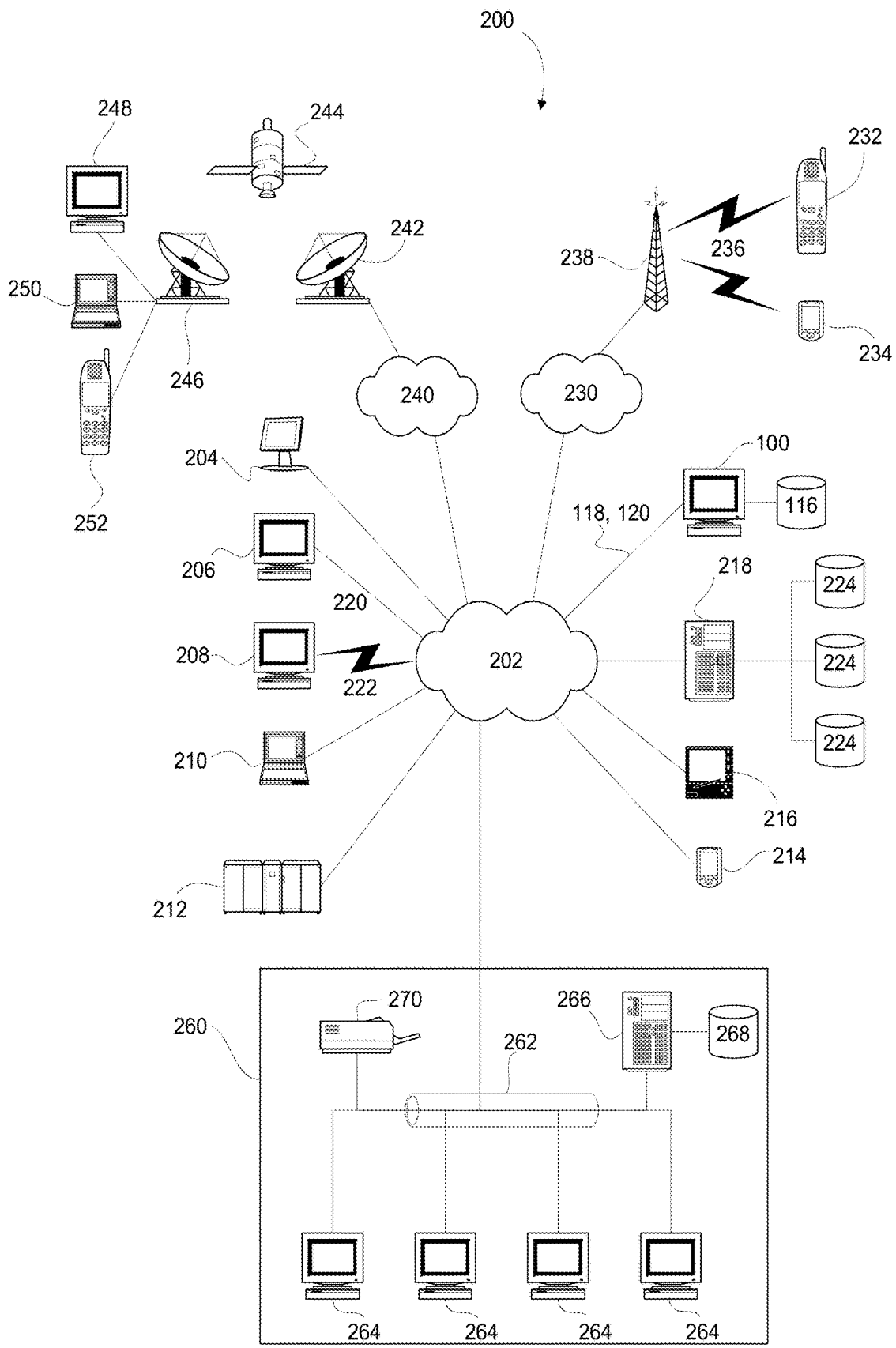
FIG. 2 illustrates an example network infrastructure that can be utilized to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with Ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, Ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation Referring to FIGS. 3A and 3B there are shown schematic diagrams of examples of wearable devices 310 for authenticating a user. In particular, the wearable device 310 includes one or more sensors. The one or more sensors are configured to generate sensor signals representing signal data related to movement of fingers of the user wearing the wearable device to provide authentication data.

Figure 3A:
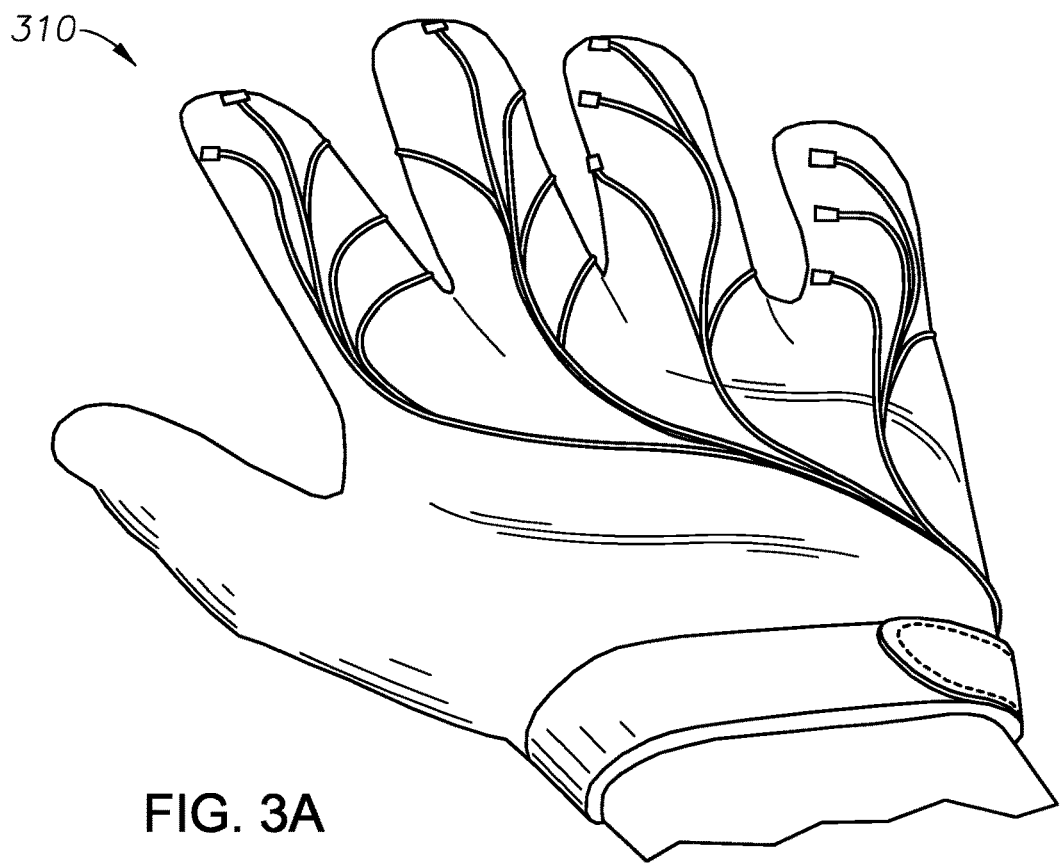
FIG. 3A illustrates a first example of a wearable device.
Figure 3B:
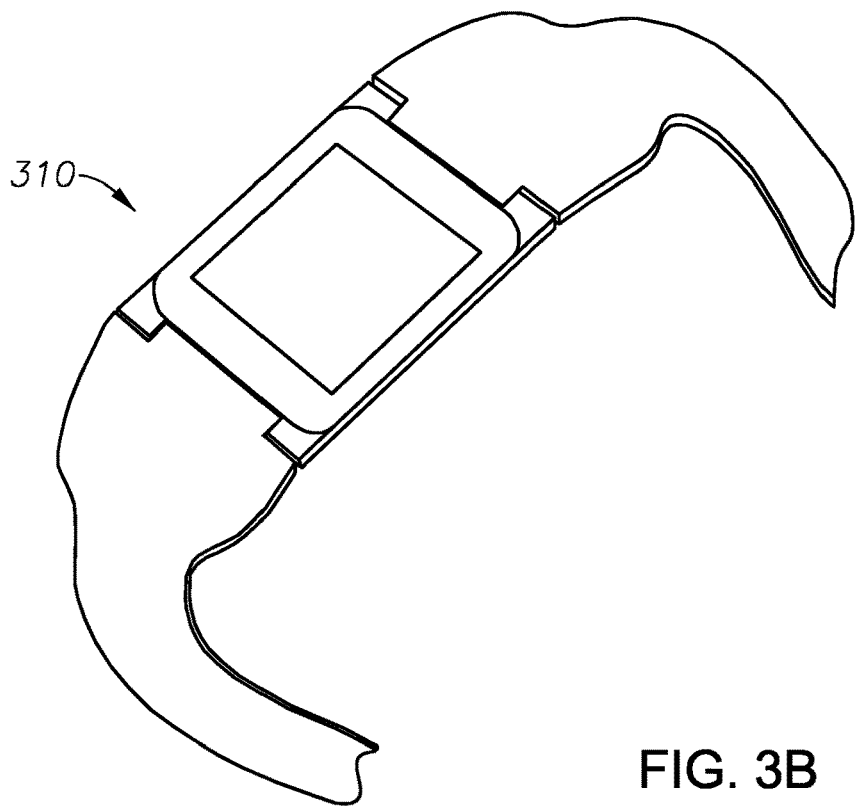
FIG. 3B illustrates another example of a wearable device.

Referring to FIG. 3A there is shown an example wearable device in the form of a glove. Referring to FIG. 3B there is shown another example of a wearable device in the form of a wrist worn electronic device such as a smart watch. It will be appreciated that whilst FIG. 3B illustrates the wearable device in the form of smart watch, other wrist worn electronic devices can also be used. In the case of the wearable device of FIG. 3B, the wrist band can include one or more sensors to sense the movement of tendons in the users wrist which are associated with movement of one or more fingers.

The sensor data is received by one or more processors and processed for determining authentication data for accessing a service. The one or more processors may be part of the wearable device or may be a separate computer implemented device such as a processing system 100, wherein the sensor data is transferred to the computer implemented device via a communication interface.

Figure 3C:
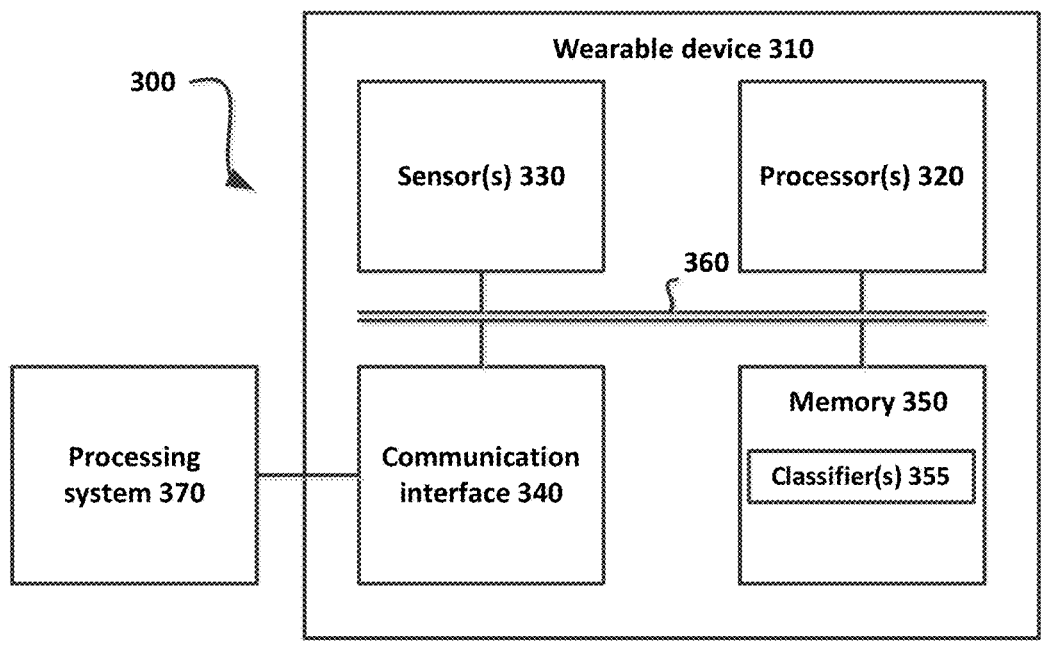
FIG. 3C illustrates schematic of a wearable device communicating with a processing system, wherein the wearable device is used for obtaining authentication data for accessing a service from the processing system.

Referring to FIG. 3C there is shown a block diagram representing a system 300 for authenticating a user using an electronic wearable device. In particular, the electronic wearable device 310 includes one or more processors 320, one or more sensors 330, a communication interface 340 and a memory 350 coupled together via a data bus 360. The memory has stored therein one or more classifiers 355. The wearable device can be in wireless communication with another processing system facilitating access to the service upon successful authentication.

Figure 4:
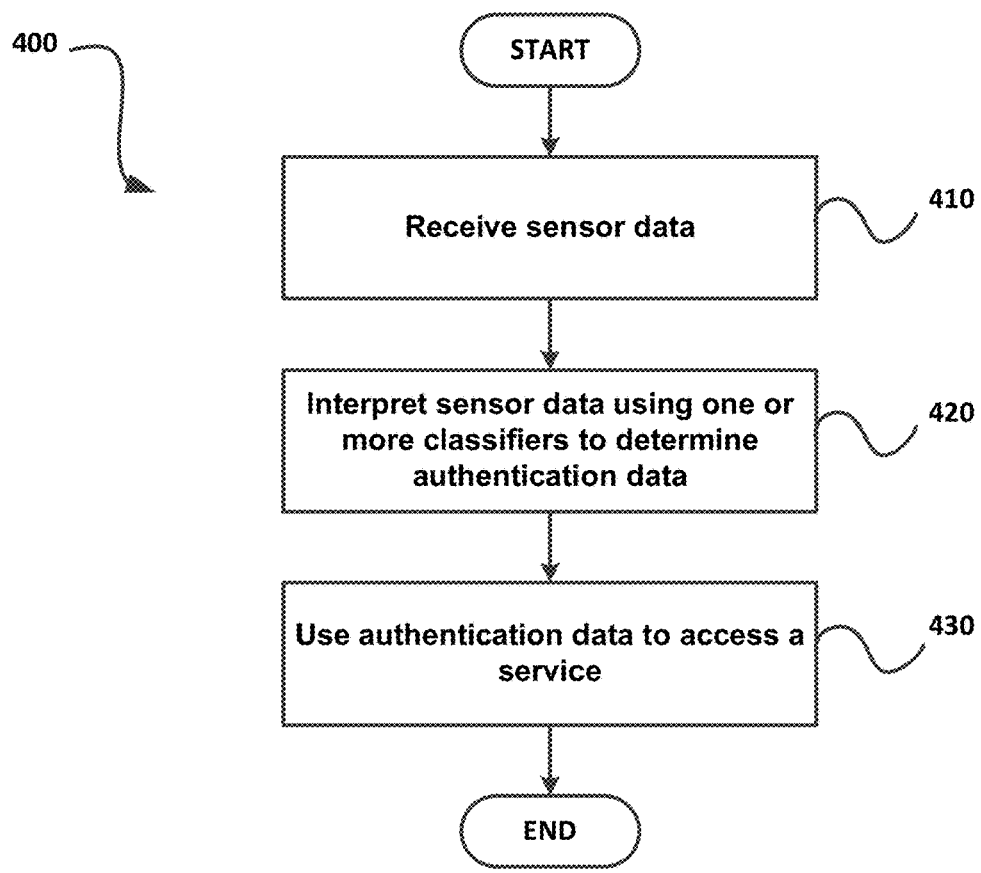
FIG. 4 is a flowchart representing an example method for user a wearable device for user authentication to access a service.

Referring to FIG. 4 there is shown a flowchart representing a method 400 performed by the one or more processors 320 of the wearable device 310 of FIG. 3. In particular, at step 410, the method 400 includes receiving the sensor data. At step 420, the method 400 includes interpreting the sensor data using one or more classifiers 355 to determine the authentication data. At step 430, the method 400 includes using the authentication data to access the service.

The one or more sensors 330 can include one or more accelerometers to determine movement of the fingers. Generally, the one or more accelerometers include one or more gyroscopes to determine the movement of the fingers. In other embodiments, the one or more sensors can additionally or alternatively include one or more location sensors (e.g., GPS), proximity sensors, biometric sensors, force sensors and/or the like.

The wearable device 310 can be operated in a training mode and an operable mode. In the training mode, the one or more classifiers are trained to interpret the sensor data to determine the authentication data. In the operable mode, the wearable device 310 is configured to interpret the sensor data using the one or more classifiers, trained in the training mode, to determine the authentication data. Generally the wearable device 310 includes an input device to be able to switch the wearable device 310 between modes.

The wearable device 310 can have particular benefits in relation authentication data such as a PIN. In one form, the one or more classifiers are trained to interpret the sensor data indicative of movement of the fingers according to a surface representing a PIN pad to determine a plurality of digits of the PIN. It will be appreciated that the surface does not necessarily bear indicia representing a PIN pad as it can simply be visualised by the user on the surface such that the user moves their fingers on the surface to indicate a selection of particular digits of the PIN by contacting or pressing the surface with one or more of their fingers.

In one form, the one or more classifiers 355 can be trained specifically to interpret a series of finger taps represented by the sensor data as authentication data. In particular, the one or more processors 320 are configured to determine, using the one or more classifiers 355, digit tap segments of the series of taps. For example, the one or more processors 320 may attempt to detect longer temporal pauses between taps to indicate a pause between different digits of the PIN. The one or more processors 320 are then configured to interpret, using the one or more classifiers 355, each digit tap segment to determine a digit of the PIN. The one or more processors 320 then combine each digit of the PIN to obtain the PIN. In one particular form, the one or more processors 320 are configured to determine, using the one or more classifiers 355, a number of finger taps represented by each finger tap segment, wherein the number of finger taps represents one of the respective digits of the PIN. For example, the user may tap their finger three times, then pause, tap their finger another seven times, then pause, then tap their finger twice, then pause, then tap their finger a further four times. Based on this example, the one or more processors 320, using the classifiers 355, can determine that the PIN is 3724.

In another form, tapping may be replaced by flexing the fingers which can also be detected using the one or more fingers. As such, the sensor data can be segmented into digit flex segments, and then each digit represented by each digit flex segment is determined and then concatenated together to form the PIN.

As shown in FIG. 3, the wearable device 310 can include a wireless communication module 340. In this regard, the wearable device 310 can be configured to transfer data indicative of the authentication data wirelessly, using the wireless communication module 340, to another computer implemented device 370 in order to obtain access to the service. In one form, the other computer implemented device 370 may be a general processing system 100, a POS device, an Automatic Teller Machine, or the like. Preferably, the one or more processors 320 encrypt the PIN upon determination and prior to transfer wirelessly to the other computer implemented device 370.

Figure 5:
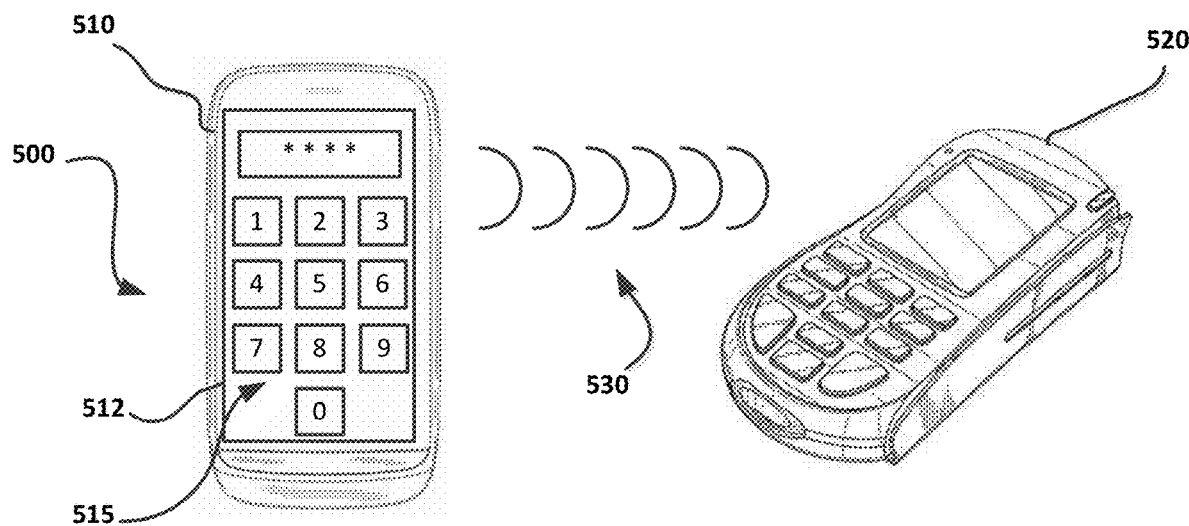
FIG. 5 is a system diagram of an example system including a user device in communication with a point-of-sale (POS) device to authenticate a user wishing to conduct a financial transaction.

Referring to FIG. 5 there is shown a point-of-sale (POS) system 500 including a POS device 520 and a user input device 510 which is physically separate to the POS device 520. The user input device 510 is in wireless communication 530 with the POS device 520.

Figure 6:
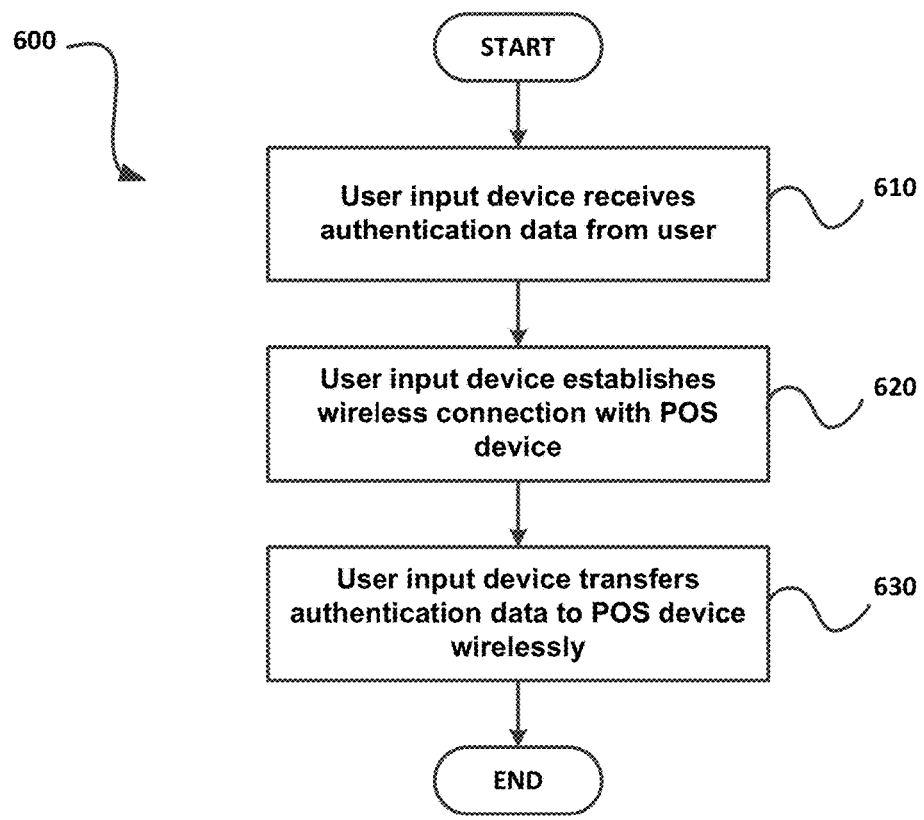
FIG. 6 is a method of a flowchart representing an example method of using a user input device for authentication with a POS device.

Referring to FIG. 6 there is shown a method of using the POS system 500 disclosed in FIG. 5. In particular, at step 610 the method 600 includes receiving, via the user input device 510, authentication data from a user interacting with the user input device 510. At step 620, the method 600 includes the user input device 510 establishing a wireless connection with the POS device 520. At step 630, the method 600 includes the user input device 510 wirelessly transferring the authentication data to the point-of-sale device 520 for authentication in order to process a transaction by the user.

In one form, the authentication data is a PIN. In one particular form, the user input device 510 may be a user's mobile communication device which has installed thereon an executable application. For example, the user's mobile communication device 510 may be a smart phone or tablet processing system which has installed thereon an "app". When authentication of the user is required in order to authenticate a financial transaction being processed by the POS device 520, the POS device 520 may communicate with the user's mobile communication device 510 to present a PIN pad interface 515 within the application 512. The user can then interact with the PIN pad interface 515 presented via the display of the mobile communication device 510, wherein data indicative of the authentication data is transferred to the POS device 520. Communication between the user input device 510 and the POS device 520 can be wireless. In one form, the wireless communication 530 may be conducted using Bluetooth protocol. It is preferable the data indicative of the authentication data is encrypted using an encryption algorithm such as triple DES or the like.

In an alternate form, the user input device 510 may be the wearable device 310 discussed in relation to FIGS. 3 and 4.

Figure 7A:
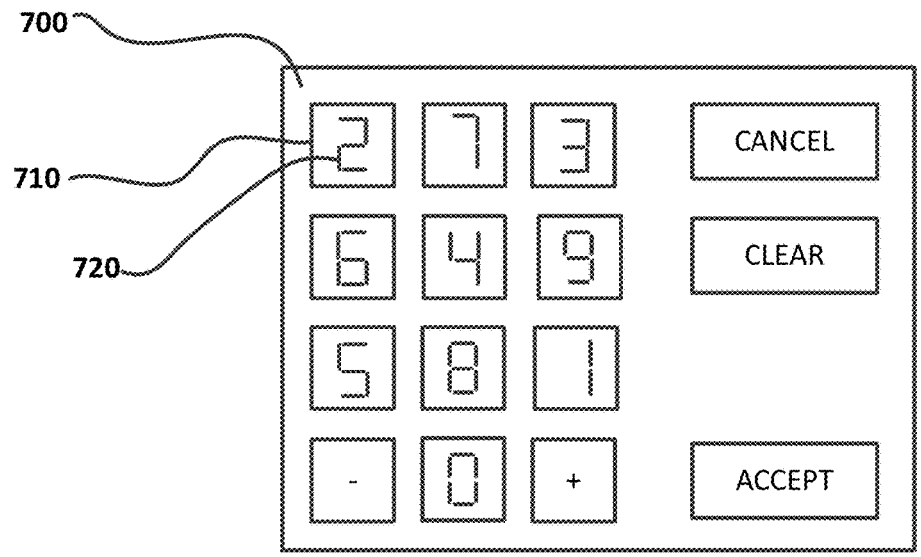
FIG. 7A is a schematic of a front view of a PIN entry device.
Figure 7B:
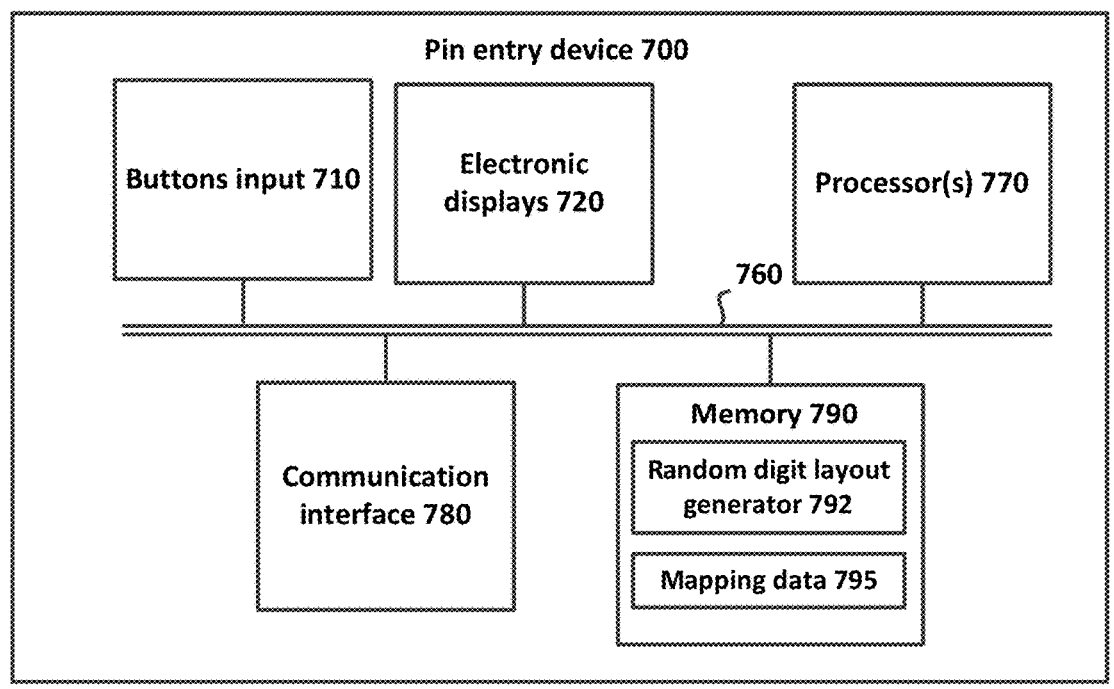
FIG. 7B is a system diagram of the PIN entry device of FIG. 7A.

Referring to FIG. 7 there is shown a PIN entry device 700 including a plurality of buttons 710. Each button 710 has an electronic display 720. The PIN entry device 700 also includes or is coupled to one or more processors 770 electrically coupled to the plurality of buttons 710. Furthermore, the one or more processors 770 are coupled to memory 790 including a random digit layout generator 792 and random digit mapping layout data 795, and a communication interface 780.

Figure 8:
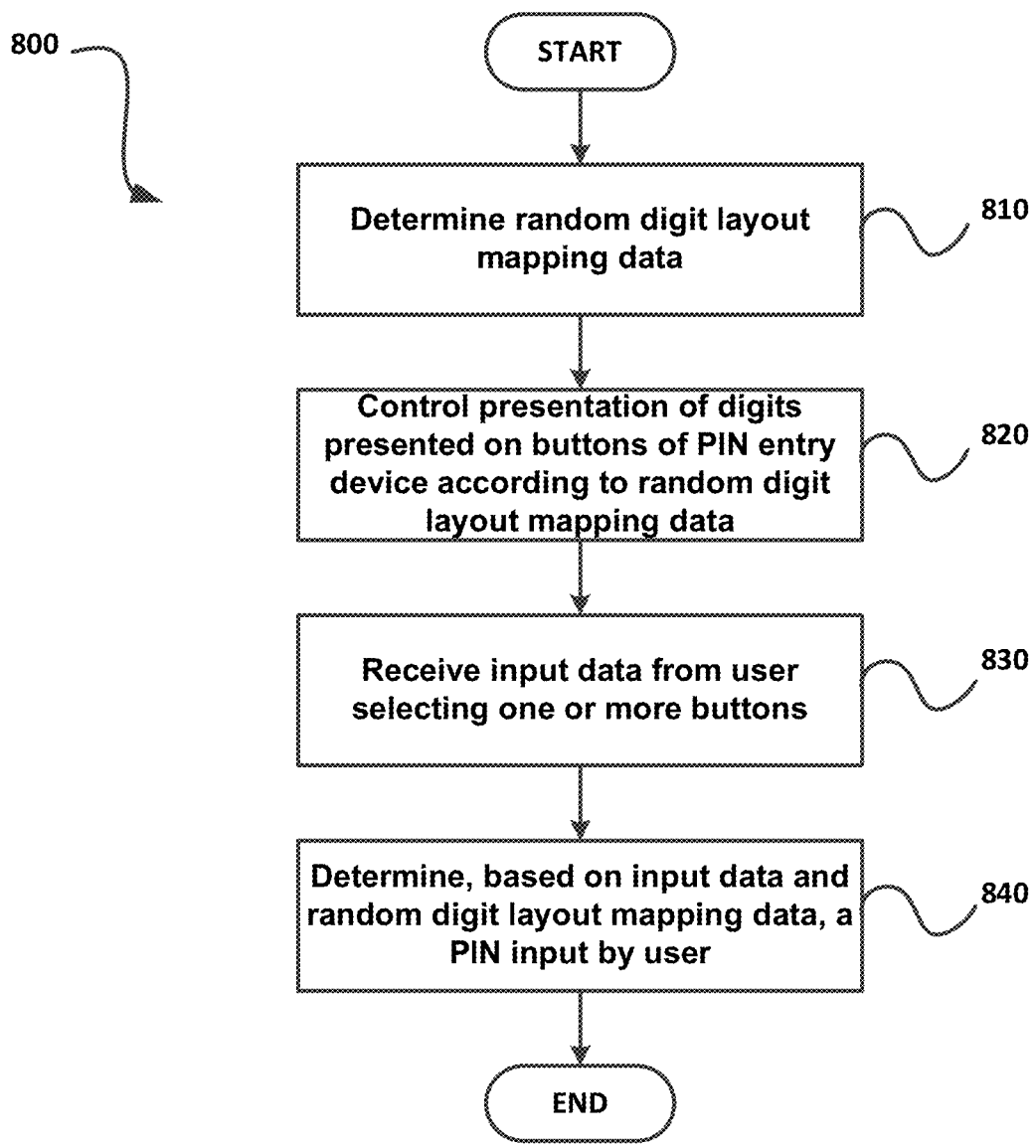
FIG. 8 is a flowchart representing a flowchart for operating the PIN entry device of FIG. 7A.

Operation of the PIN entry device 700 will now be discussed in relation to FIG. 8. In particular, at step 810, the method 800 includes the one or more processors 770 determining random digit layout mapping data 795. At step 820, the method 800 includes the one or more processors 770 controlling presentation of a digit by the electronic display 720 of each button 710 according to the random digit layout mapping data 795. At step 830, the method 800 includes receiving input data by a user selecting one or more of the buttons 710. At step 840, the method includes the one or more processors 770 determining, based on the input data and the random digit layout mapping data, a PIN for the user.

In one form, the one or more processors 770 are configured to determine the random digit layout mapping data for each transaction. For example, the one or more processors may execute a software module such as the random digit layout generator 792 to determine a random layout of the digits (0-9) for the PIN entry device. In one form, the one or more processors may be configured to generate the random digit layout which is not a traditional digit layout (i.e. first row from left to right being "1", "2", "3", second row from left to right being "4", "5", "6", third row from left to right "7", "8" and "9" and fourth row "0"). As such, the random digit layout presented by the PIN entry device is a non-traditional digit layout. For example, the random digit layout mapping data may include for example a first row from left to right being "3", "4", "9", second row from left to right being "1", "7", "8", a third row from left to right "2", "6" and "5", and a fourth row of "0".

The electronic display 720 for each button 710 may include a segmented display such as a seven segmented display such that the one or more processors 770 are electrically connected thereto to control the presentation of the respective digit according to the random digit layout mapping data 795.

It will be appreciated that upon determining the PIN, the one or more processors 770 encrypts the PIN using an encryption algorithm such as triple DES or the like. It will also be appreciated that the random digit layout mapping data 795 may be stored in memory in an encrypted manner.

It will be appreciated that the PIN entry device 700 can be part of a POS device. Alternatively, the PIN entry device may be part of an Automatic Teller Machine (ATM).

It will be appreciated that the random digit layout mapping data 792 can be utilised with mobile processing devices 510 such as those discussed in relation to FIGS. 5 and 6. In particular, the mobile communication device 510 determines random digit layout mapping data and then generates the PIN pad interface 515 in accordance with the random digit layout mapping data which is presented via the application 512 executed by the mobile communication device 510. The user can then interact with the random digit layout of the PIN pad interface 515 presented by the display of the mobile communication device 510 in order to select the appropriate interface elements of the PIN pad interface 512 to input the authentication data in the form of the user's PIN. Data indicative of the PIN can then be encrypted as discussed above prior to being transferred to the POS device 520 for processing.

Figure 9:
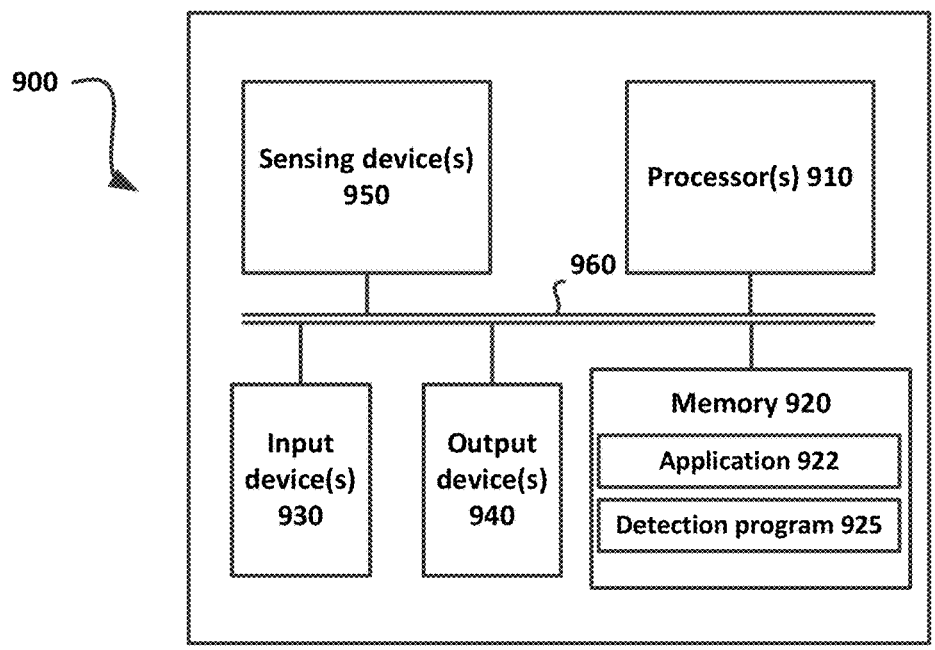
FIG. 9 is a system diagram of an example processing system for detecting a security risk associated with sensitive data.

Referring to FIG. 9 there is shown a schematic of a processing system 900 configured for detecting a security risk. In one form, the processing system 900 includes one or more processors 910 coupled to one or more sensors 950, one or more output devices 904 in the form of a display and one or more input devices 930. In one form, the one or more sensors 950 are part of the processing system 900, however it is also possible that the one or more sensors 950 are not integrated with the processing system 900.

Figure 10:
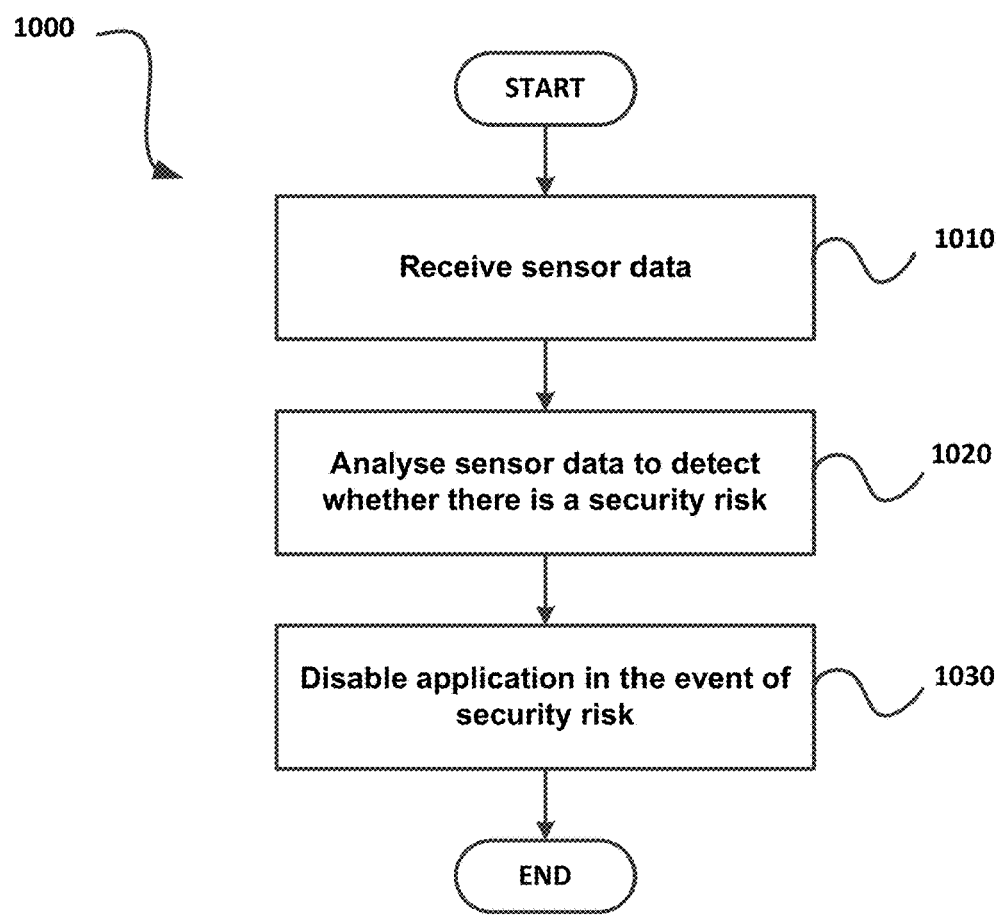
FIG. 10 is a flowchart representing a method performed by the processing system of FIG. 9.

Referring to FIG. 10 there is shown a flowchart representing a method 1000 performed by the processing system 900 of FIG. 9 for detecting a security risk. In particular, at step 1010, the method 1000 includes the one or more processors 910 receiving sensor data. At step 1020, the method 1000 includes the one or more processors 910 analysing the sensor data to detect whether there is a security risk of the sensitive data being vulnerable. The sensitive data can be input by a user using the input device 930 or displayed by the display of the processing system 900. At step 1030, the method 1000 includes the one or more processors 910 disabling an application 922 open at the processing system 900 in response to detecting the security risk.

In one form, the one or more processors 910 are configured to determine, based on the sensor data, a user position relative to the display 940. The user position is then compared by the one or more processors 910 to user position criteria stored in memory 920 of the processing system 900. The security risk can be detected in response to the user position failing to satisfy the user position criteria. The user position can be an angular user position relative to the display. In particular, in the event that the user is facing the display 940 of the processing system 900 substantially front-on then the application 922 is not disabled. However, in the event that the user's head is laterally moved relative to the display so that the user is no longer face the display front-on or is turned such that the user is not facing the display within an angular user position range (e.g. +/−90 degrees), then the one or more processors 910 are configured to disable the application 922.

In this regard, the one or more sensors 950 may be a camera such as a web-cam or an thermographic camera. The one or more processing systems 900 may be configured to perform image processing system upon one or more images to determine a user position relative to the display.

In another form, the one or more processors 910 can be configured to detect the security risk based on the sensor data 950 being indicative of a camera flash. In particular, the one or more sensors 950 may be a light sensor such as a photocell, photoresistor, photodiode or phototransistor, wherein the one or more processors 910 receive a signal indicative of light sensed. In the event that a flash has of a camera has been captured by the light sensor 950 based on analysis of the received signal, the application 922 can be disabled. In other embodiments, a web-cam or camera can be used as the one or more sensors 950, wherein a stream of images or video footage can be analysed by the one or more processors 910 to determine whether a flash has been detected. In response to the positive detection of a flash, the application 922 is disabled.

In another form, the one or more processors 910 can be configured to detect, based on the sensor data, a number of users. The security risk is detected in the event that more than one user are detected adjacent the processing system 900 or zero users are detected adjacent the processing system 900. In particular, in the event that the user walks away from the processing system 900 and sensitive data is left presented upon the display 940, the one or more processors 910 can detect, based on analysis of the sensor data, the security risk and disable the application 922. Alternatively, in the event that another person is "shoulder surfing", the determination of two users through analysis performed by the one or more processors 910 can be detected as the security risk resulting in the disabling of the application 922.

In this embodiment, the one or more sensors 950 can be a camera such as a web-cam, an infra-red sensor or thermographic camera. For example, in relation to an infra-red sensor, in the event that no signal is received by the one or more processors 910 indicative of a user, the security risk is detected. In relation to camera devices 950 such as web-cam or a thermographic camera, the one or more processors 910 may perform image analysis to determine the number of users captured in the image in order to determine whether a security risk has been detected.

In the above embodiments, disabling the application 922 can include the application being minimized. Additionally, the application 922 may be locked or prevented from being opened without successful user authentication. For example, authentication data such as a valid password may be required to be entered using the input device 930 of the processing system 900 in order for the application 922 to be reopened. In another form, the disabling of the application 922 may include locking the operating system such that the application 922 is in turn disabled from being used. The application 922 can then be reused only upon the operating system being unlocked by successful user authentication which can include the entering of a password or the like.

Generally, the processing system 900 has installed in memory a detection computer program 925 which configures the processing system 900 to operate as described above. It will be appreciated that there may be instances where the user wishes to present information to another user viewing the display 940 or wishes to input data presented on the display with another user. In this instance, the user can disable the detection computer program 922 executing in the processing system 900 in order to allow such actions to take place. Once the user wishes for the risk detection processes to recommence, the user can interact with the computer program 922 executing upon the processing system 900 to indicate the recommencement of the risk detection process.

It will be appreciated that the computer program 925 executable by the processing system 900 may be re-enabled after a temporal threshold period of time. For example, the threshold may be 60 minutes, wherein after 60 minutes has elapsed since the detection computer program 925 was disabled, the computer program 925 of the processing system 900 is re-enabled.

In another instance, the user can interact with the computer program 925 of the processing system 900 to reduce the security risks being detected for a period of time. For example, the user may be working with a colleague at the processing system 900 for the next hour and as such the user wishes to configure the processing system 900 such that detected or suspected shoulder surfing is not considered a security risk for this period of time. As such, the user has interact with the computer program 925 to restrict detections of multiple users viewing the display of the processing system 900 for the next hour. However, in the event that the users walk away from the processing system 900 during this hour period, the processing system 900 can detect this type of security risk and disable the application 922.

Figure 11:
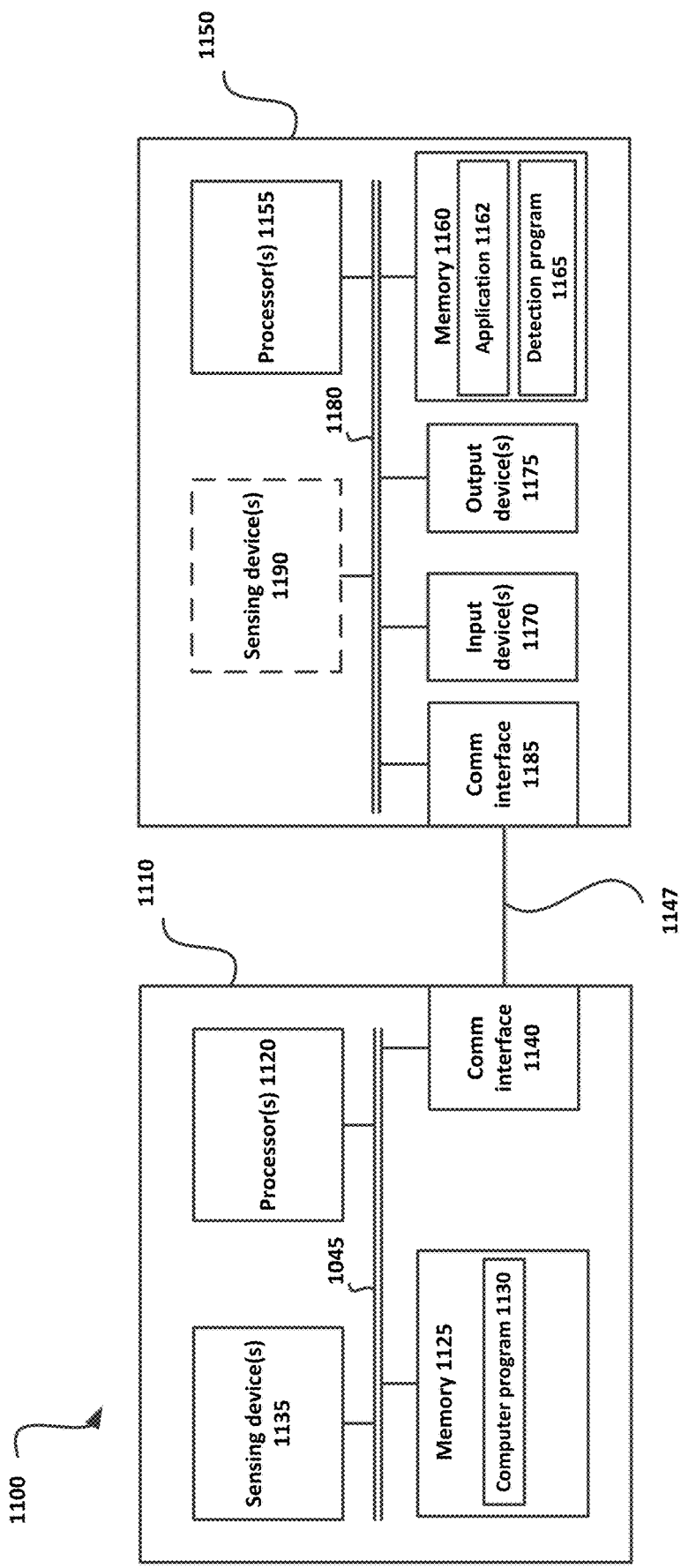
FIG. 11 is a system diagram of an example system including a detection device for detecting a security risk associated with sensitive data input to or output by a processing system.

Referring to FIG. 11 there is shown a schematic of an example of a detection device 1110 which can be part of a detection system 1100. The detection device 1110 includes one or more sensors 1135, a communication interface 1140 for coupling the detection device 1110 to a processing system 1150 executing an application 1162 associated with sensitive data, a memory 1125, and one or more processors 1120 coupled to the one or more sensors 1135, the memory 1125 and the communication interface 1140.

Figure 12:
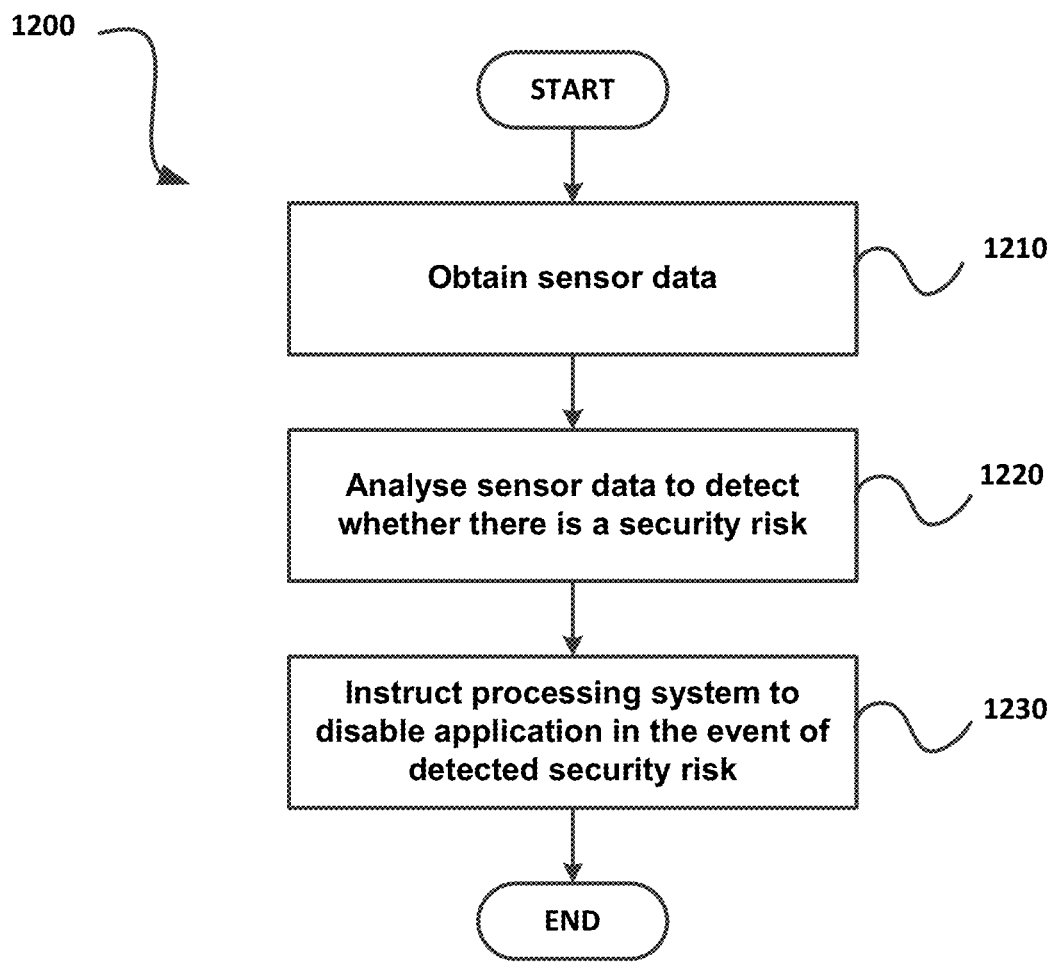
FIG. 12 is a flowchart representing a method performed by the detection device.

Referring to FIG. 12 there is shown a flowchart representing an example method 1200 performed by the detection device 1110. In particular, at step 1210, the method 1200 includes the one or more processors 1120 obtaining sensor data from the one or more sensors 1135. At step 1220, the method 1200 includes the one or more processors 1120 analysing the sensor data to detect whether there is a security risk of the sensitive data being vulnerable, the sensitive data being input by a user using an input device 1170 or output by an output device 1175 of the processing system 1150. At step 1230, the method 1200 includes the one or more processors 1120 instructing the processing system 1150, via the communication interface 1140, to disable the application in response to detecting the security risk.

In one form, the one or more processors 1120 are configured to determine, based on the sensor data, a user position relative to the output device 1175 such as the display of the processing system 1150. The user position is then compared by the one or more processors 1120 to user position criteria stored in memory 1125 of the detection device 1110. The security risk can be detected in response to the user position failing to satisfy the user position criteria. The user position can be an angular user position relative to the display 1175. In particular, in the event that the user is facing the display 1175 of the processing system 1150 substantially front-on then the application 1162 is not disabled. However, in the event that the user's head is laterally moved relative to the display such that the user is not facing the display 1175 front-on or is turned such that the user is not facing the display within an angular user position range (e.g. +/−90 degrees), then the one or more processors 1120 are configured to disable the application 1162.

In this regard, the one or more sensors 1135 may be a camera such as a web-cam or an thermographic camera. The one or more processors 1120 may be configured to perform image processing system upon one or more images to determine a user position relative to the display 1175 of the processing system 1150.

In another form, the one or more processors 1120 can be configured to detect the security risk based on the sensor data being indicative of a camera flash. In particular, the one or more sensors 1135 may be a light sensor such as a photocell, photoresistor, photodiode or phototransistor, wherein the one or more processors 1120 receive a signal indicative of light sensed. In the event that a flash has been captured by the light sensor 1135 based on analysis of the received signal, the instruction is transferred to disable the application 1162. In other embodiments, a web-cam or camera can be used as the one or more sensors 1135, wherein a stream of images or video footage can be analyzed by the one or more processors 1120 to determine whether a flash has been detected. In response to the positive detection of a flash, the instruction to disabled the application 1162 is transferred.

In another form, the one or more processors 1120 can be configured to detect, based on the sensor data, a number of users that are located adjacent the processing system 1150. The security risk is detected in the event that more than one user is detected adjacent the processing system 1150 or zero users are detected adjacent the processing system 1150. In particular, in the event that the user walks away from the processing system 1150 and sensitive data is presented by the output device 1175, the one or more processors 1155 can detect, based on analysis of the sensor data, the security risk and instruct the processing system 1150 to disable the application 1162. Alternatively, in the event that another person is "shoulder surfing", the determination of two users can be detected as the security risk resulting in the detection device 1110 transferring the instruction to the processing system 1150 to disable the application 1162.

In this embodiment, the one or more sensors 1135 can be a camera such as a web-cam, an infra-red sensor or thermographic camera. For example, in relation to an infra-red sensor, in the event that no signal is received by the one or more processors 1120 indicative of a user, the security risk is detected. In relation to camera devices such as web-cam or a thermographic camera, the one or more processors 1120 may perform image analysis to determine the number of users captured in the image in order to determine whether a security risk has been detected.

In the above embodiments, disabling the application 1162 can include the application 1162 being minimized. Additionally, the application 1162 may be locked or prevented from being opened without successful user authentication. For example, authentication data such as a valid password may be required to be entered using the input device 1170 of the processing system 1150 in order for the application 1162 to be reopened. In another form, the disabling of the application 1162 may include locking the operating system such that the application 1162 is in turn disabled from being used. The application 1162 can then be reused only upon the operating system being unlocked by successful user authentication which can include the entering of a password or the like.

The communication interface 1140 of the detection device 1110 can be a wireless communication interface such as Bluetooth, WiFi, or the like. Alternatively, a physical communication interface such as a USB cable, serial cable or the like can be used to communicate data between the detection device 1110 and the communication interface 1185 of the processing system 1150.

Generally, the processing system 1150 has installed in memory 1160 a detection computer program 1165 which configures the processing system 1150 to operate as described above, in that an instruction received from the detection device 1110 is used to disable the application 1162 in response to detecting the security risk.

It will be appreciated that there may be instances where the user wishes to present information to another user viewing the display 1170 or wishes to input data with another user present and adjacent the processing system 1150. In this instance, the user can disable the detection computer program 1162 executing in the processing system 1150 in order to allow such actions to take place. Additionally or alternatively, the processing system 1150 can transfer, in response to the user providing input to request disablement of the detection process, an instruction or command to the detection device 1110 to be disabled. As such, a computer program 1130 executed by the one or more processors 1120 of the detection device 1110 can be disabled in response to receiving the command or instruction from the processing system 1150.

Once the user wishes for the risk detection processes to recommence, the user can interact with the computer program 1160 of the processing system 1150 to indicate the recommencement of the risk detection process, and in response the processing system 1150 transfers to the detection device 1110, via the communication interfaces 1185, 1140, the command or instruction to re-enable the computer program 1130 of the detection device 1110 such that security risks can again be detected.

It will be appreciated that the computer program 1162 executable by the processing system 1150 may automatically request re-enablement of the software after a temporal threshold period of time. For example, the threshold may be 60 minutes wherein after 60 minutes has elapsed since the detection device 1110 was disabled, the computer program 1165 of the processing system 1150 transfers a re-enablement command or instruction to the detection device 1110. Alternatively, the computer program 1130 of the detection device 1110 may monitor the period of time disabled and then re-enable after a threshold period of time of disablement has elapsed.

In another instance, the user can interact with the computer program 1165 of the processing system and/or the computer program 1130 of the detection device 1110 to reduce a number types of security risks being detected for a period of time. For example, the user may be working with a colleague at the processing system 1150 for the next hour and as such the user interacts with the computer program 1165 of the processing system 1150 and/or the computer program 1130 of the detection device 1110 to reduce the security risks detected for shoulder surfing for the next hour. As such, the application 1162 is not disabled despite multiple users viewing the display of the processing system 1150 for the next hour. However, other types security risks are still monitored during this period. Therefore, in the event that the users walk away from the processing system 1150 during this hour period, the detection device can detect this security risk and disable the application 1162 being executed by the processing system 1150.

It will be appreciated that in some instances the processing system 1150 may also include integrated sensors such as a webcam for a laptop processing system. As such, sensor data can be obtained by the one or more processors 1155 from the of the one or more sensors 1190 (shown in dotted line) and transferred, via the communication interfaces 1185, 1140 to the detection device 1110 to be analyzed to determine if there a security risk. Thus, one or more sensors 1135 of the detection device 1110 and one or more sensors 1190 of the processing system 1150 can be used to detect if there is a security risk.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A wearable device for authenticating a user, comprising:
   one or more sensors for obtaining sensor data related to movement of fingers of the user wearing the wearable device to provide authentication data, wherein the authentication data comprises a Personal Identification Number (PIN); and
   one or more processors configured to:
      receive the sensor data, wherein the sensor data comprises data indicative of a plurality of relative spatial locations where one or more of the fingers contact a surface, wherein the surface represents a PIN pad, and wherein the PIN pad is not displayed to the user;

interpret the sensor data using one or more classifiers to determine the authentication data, wherein interpret the sensor data comprises determine a plurality of digits of the PIN based on the sensor data; and transfer data indicative of the authentication data to a point-of-sale (POS) device or an Automatic Teller Machine (ATM) to access a service.

2. The wearable device according to claim 1, wherein the one or more sensors comprises:

one or more accelerometers to determine the movement of the fingers;

one or more gyroscopes to determine the movement of the fingers; or combinations thereof.

3. The wearable device according to claim 1, wherein the wearable device is either a glove worn on the user's hand or a smart watch.

4. The wearable device according to claim 1, wherein:

the one or more processors are further configured to train the one or more classifiers to interpret the sensor data to determine the authentication data if the wearable device is in a training mode; and interpret the sensor data further comprises interpret the sensor data using the one or more classifiers, trained in the training mode, to determine the authentication data if the wearable device is in an operable mode.

5. The wearable device according to claim 4, wherein train the one or more classifiers comprises train the one or more classifiers to interpret the sensor data indicative of the movement of the fingers according to the surface representing the PIN pad to determine the plurality of digits of the PIN.

6. The wearable device according to claim 4, wherein train the one or more classifiers comprises train the one or more classifiers to interpret a series of finger taps represented by the sensor data as the authentication data by:

determining, using the one or more classifiers, digit tap segments of the series of finger taps;

interpreting, using the one or more classifiers, each digit tap segment to determine a respective digit of the PIN; and combining each digit of the PIN to obtain the PIN.

7. The wearable device according to claim 6, wherein interpreting, using the one or more classifiers, each digit tap segment comprises determining, using the one or more classifiers, a number of finger taps represented by each digit tap segment, wherein the number of finger taps represents the respective digit of the PIN.

8. The wearable device according to claim 1, wherein the wearable device further comprises a wireless communication module, wherein the wearable device is configured to transfer the data indicative of the authentication data wirelessly using the wireless communication module.

9. The wearable device according to claim 1, wherein the sensor data further comprises data indicative of movement of tendons of the user, wherein the movement of the tendons is associated with the movement of the fingers.

10. The wearable device according to claim 1, wherein the sensor data further comprises data indicative of a series of finger taps, wherein the series of finger taps includes one or more digit tap segments, each digit tap segment corresponding to a respective digit of the PIN.

11. The wearable device according to claim 1, wherein the sensor data further comprises data indicative of a series of finger flexes, wherein the series of finger flexes includes one or more digit flex segments, each digit flex segment corresponding to a respective digit of the PIN.

12. A non-transient computer readable medium comprising executable instructions which, when executed by one or more processors, cause the one or more processors to:

receive sensor data obtained using one or more sensors of a wearable device, wherein the sensor data is related to movement of fingers of a user wearing the wearable device to provide authentication data, wherein the authentication data comprises a Personal Identification Number (PIN), wherein the sensor data comprises:

data indicative of a plurality of relative spatial locations where one or more of the fingers contact a surface, wherein the surface represents a PIN pad, and wherein the PIN pad is not displayed to the user; and data indicative of a series of finger flexes, wherein the series of finger flexes includes one or more digit flex segments corresponding to a plurality of digits of the PIN, and wherein each digit flex segment corresponds to a respective digit of the PIN;

interpret the sensor data using one or more classifiers to determine the authentication data, wherein interpret the sensor data comprises determine the plurality of digits of the PIN based on the sensor data; and transfer data indicative of the authentication data to a point-of-sale (POS) device or an Automatic Teller Machine (ATM) to access a service.

13. The computer readable medium according to claim 12, wherein the one or more sensors comprises:

one or more accelerometers to determine the movement of the fingers;

one or more gyroscopes to determine the movement of the fingers; or combinations thereof.

14. The computer readable medium according to claim 12, wherein:

the executable instructions, when executed by the one or more processors, further cause the one or more processors to train the one or more classifiers to interpret the sensor data to determine the authentication data if the wearable device is in a training mode; and the executable instructions which, when executed by the one or more processors, cause the one or more processors to interpret the sensor data further cause the one or more processors to interpret the sensor data using the one or more classifiers, trained in the training mode, to determine the authentication data if the wearable device is in an operable mode.

15. The computer readable medium according to claim 14, wherein the executable instructions which, when executed by the one or more processors, cause the one or more processors to train the one or more classifiers further cause the one or more processors to train the one or more classifiers to interpret the sensor data indicative of the movement of the fingers according to the surface representing a PIN pad to determine the plurality of digits of the PIN.

16. The computer readable medium according to claim 14, wherein the executable instructions which, when executed by the one or more processors, cause the one or more processors to train the one or more classifiers further cause the one or more processors to train the one or more classifiers to interpret a series of finger taps represented by the sensor data as the authentication data by:

determining, using the one or more classifiers, digit tap segments of the series of finger taps;

interpreting, using the one or more classifiers, each digit tap segment to determine the respective digit of the PIN; and combining each digit of the PIN to obtain the PIN.

17. The computer readable medium according to claim 16, wherein interpreting, using the one or more classifiers, each digit tap segment comprises determining, using the one or more classifiers, a number of finger taps represented by each digit tap segment, wherein the number of finger taps represents the respective digit of the PIN.

18. The computer readable medium according to claim 12, wherein the wearable device comprises a wireless communication module, wherein the wearable device is configured to transfer the data indicative of the authentication data wirelessly using the wireless communication module.

19. The computer readable medium according to claim 12, wherein the executable instructions which, when executed by the one or more processors, cause the one or more processors to determine the plurality of digits of the PIN further cause the one or more processors to determine the plurality of digits of the PIN based on the series of finger flexes indicated by the sensor data.

* * * * *